INVENTORS:
FOLKE MAGNUSSON
GÖRAN HALLBERG
BY THEIR ATTORNEYS
Howson & Howson

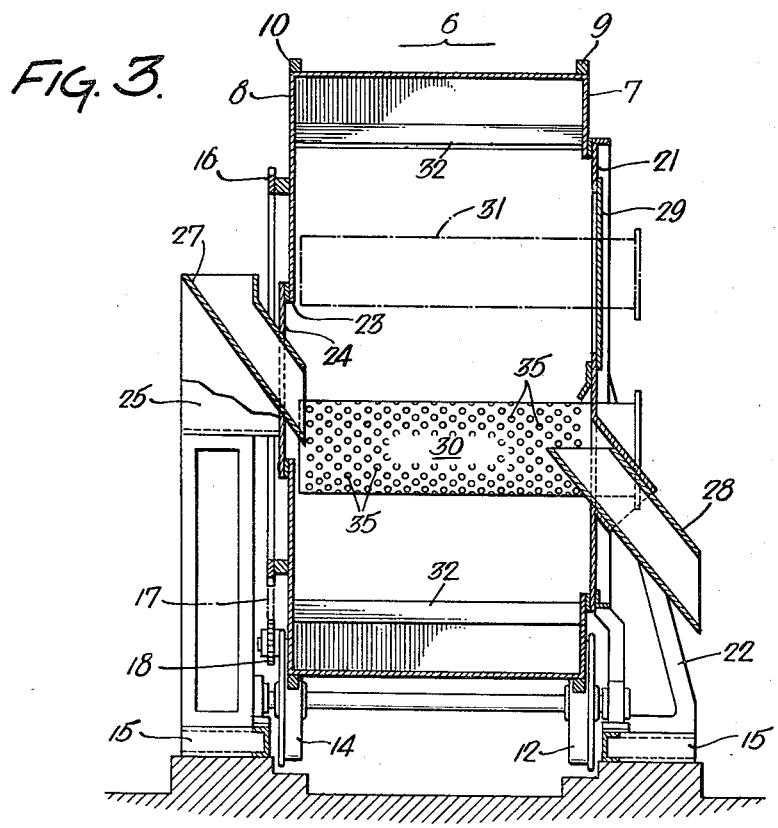
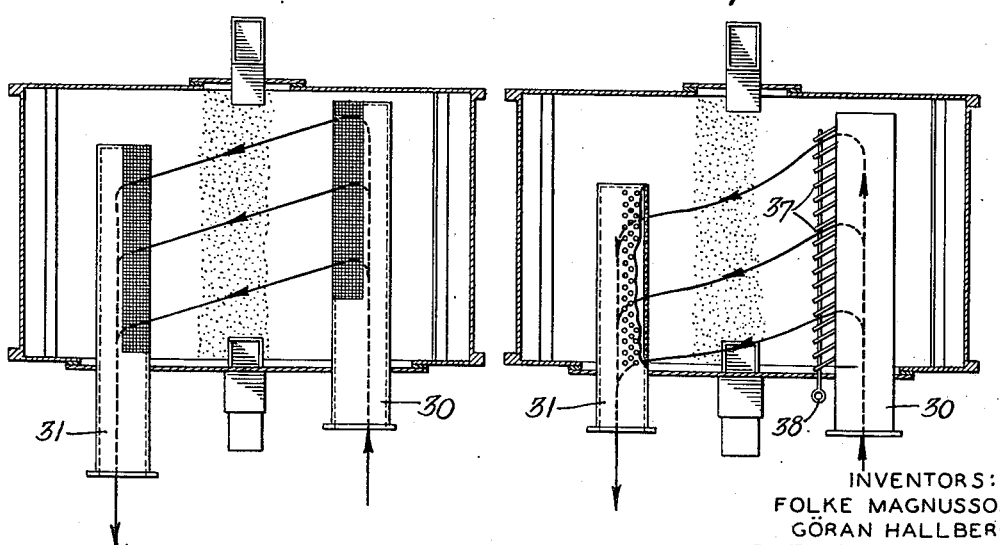
INVENTORS:
FOLKE MAGNUSSON
GÖRAN HALLBERG
BY THEIR ATTORNEYS
Howson & Howson United States Patent Office 2,709,306
Patented May 31, 1955

2,709,306

METHOD AND APPARATUS FOR TREATING PULVERULENT, GRANULAR, AND LIKE MATERIALS BY A GASEOUS MEDIUM

Folke Magnusson and Göran Hallberg, Stockholm, Sweden, assignors to AB Svenska Fläktfabriken, Stockholm, Sweden Application January 2, 1952, Serial No. 264,626

8 Claims. (Cl. 34—33)

The present invention relates to a method and apparatus for the direct treatment of pulverulent, granular and like material by a gaseous medium. The gaseous medium may comprise air, gas, or the like and the treatment of the material may constitute drying, cooling, or some other conditioning.

Primarily, the invention relates to a method and an apparatus for treating materials such, for example, as sand, sawdust, waste fuel, etc., which because of the cost cannot be treated by the conventional expensive and complex apparatus. The present invention, therefore, contemplates novel apparatus for treating inexpensive waste materials economically without attempting too great an improvement. Prior to the present invention, apparatus of this character has been relatively crude and built for each special case and the present invention provides an inexpensive substitute of a more satisfactory character.

More specifically, the invention contemplates improved apparatus wherein the material is fed into one end of a chamber in which it is carried in more or less continuous flow to the upper portion thereof and permitted to fall freely down to the bottom of the chamber as a curtain of material dividing the chamber into two parts. The semicircular travel of the material is repeated successively until the material is withdrawn from the opposite end of the chamber. At the same time, the gaseous medium is injected into one side of the chamber, and withdrawn from the other side thereby causing the medium to pass through the curtain of material.

The invention is described more fully with reference to the accompanying drawings, in which:

Fig. 3 is a longitudinal sectional view of the apparatus; and,

Figs. 4 and 5 are schematic horizontal sectional views illustrating modifications made in accordance with the present invention.

Figure 1:
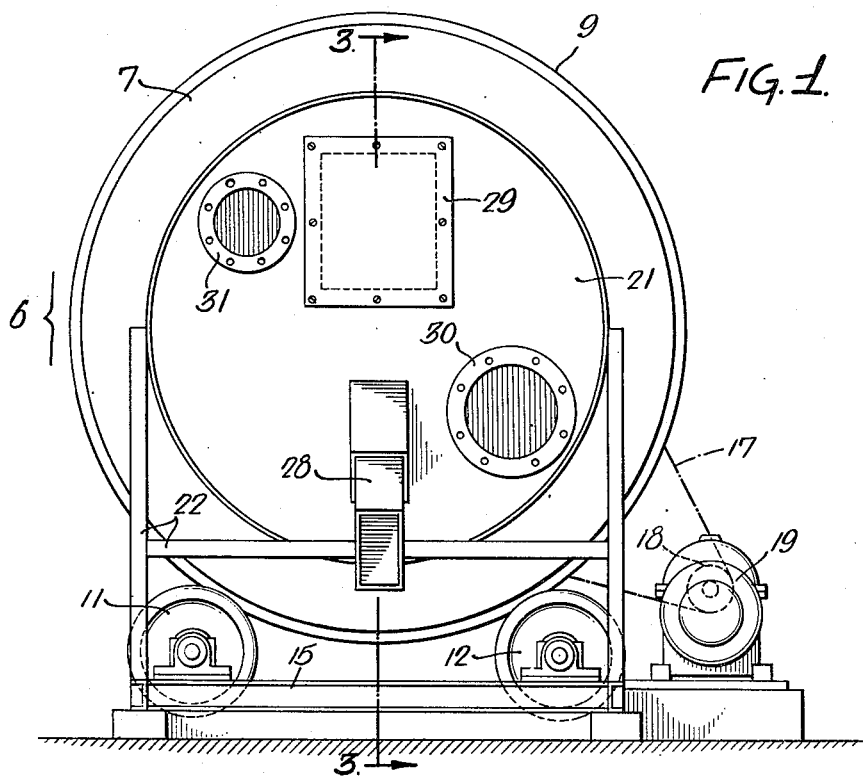
Fig. 1 is an end elevational view of the apparatus made in accordance with the present invention.
Figure 2:
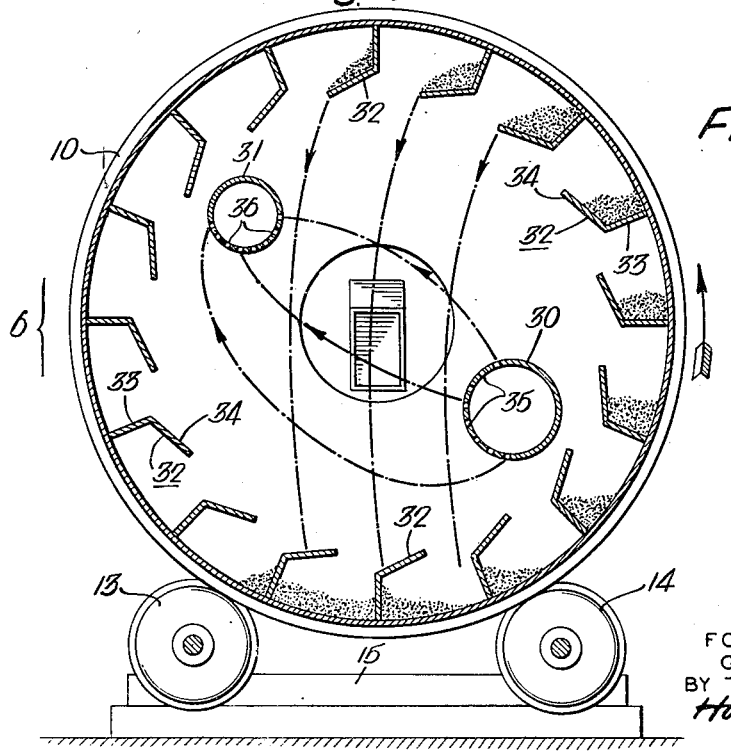
Fig. 2 is a transverse sectional view of the apparatus in Fig. 1.

In the embodiment illustrated in Figs. 1 to 3, the apparatus comprises a cylindrical drum 6 mounted for rotation about a horizontal axis. The opposite ends of the drum are provided with annular end plates 7 and 8 which, in the present instance, are formed integrally with the envelope of the drum 6. Rings 9 and 10 extend about the outer periphery of the drum at the opposite ends thereof adjacent the end plates 7 and 8. The rings 9 and 10 are rotatably supported on wheels 11 and 12, and 13 and 14 respectively which are journaled in a framework 15 fastened to the floor. An annular sprocket wheel 16 is secured to the end plate 8 coaxially with the drum and serves to rotate the drum at a predetermined speed on the supporting wheels 11, 12, 13 and 14. The sprocket wheel 16 is driven from an electrical motor 19 through a chain drive sprocket 18 and an endless chain 17, for example, in a direction indicated by the arrow in Fig. 2.

To prevent the escape from the drum of the gaseous medium and the material being treated, the central openings 20 and 23 in the end plates 7 and 8 are covered by end pieces 21 and 24 respectively. The end pieces are fixed relative to the frame and are supported by upright portions thereof 22 and 25 respectively. Packing means is provided between the end pieces 21 and 24 and the respective end plates 7 and 8 as is illustrated diagrammatically in Fig. 3 to afford relative rotary movement of these members.

The material is fed into the chamber defined by the drum 6 through an inlet 27 and is withdrawn after treatment through an outlet 28. An inspection window 29 is provided so that the operation of the machine may be supervised. The gaseous medium is introduced into the drum by means of an inlet tube 30 and is withdrawn by an outlet tube 31, which tubes, in the present instance, are mounted on the end plate 21.

Interiorly of the drum and disposed circumferentially thereabout are a plurality of conveyor members 32. Each member comprises a radial wall member or plate 33 attached to the envelope of the drum 6 and projecting substantially radially inwardly. A second plate 34 is integrally connected to the interior free edge of the plate 33 at an obtuse angle therewith to form an inner wall spaced inwardly from the interior surface of the drum. The conveyor members 32 are defined by the walls 33 and 34 which extend longitudinally the entire length of the drum and are rigidly secured to the end plates 7 and 8. In this manner, the members 32 form cups or long grooves which catch the material at the bottom of the drum and carry it upwardly to the top portion thereof as the drum rotates about its horizontal axis. When the members 32 attain their uppermost position, the material carried therein is emptied and falls freely towards the bottom of the drum to form a substantially continuous curtain of material. This curtain is indicated by the lines in Fig. 2, and, as indicated, the curtain is formed intermediate the gas inlet and outlet tubes 30 and 31 respectively.

The tubes 30 and 31 are perforated as indicated at 35 and 36 respectively, and the tubes and the perforations are arranged so that the gaseous medium is directed a predetermined narrow path upwardly through the curtain of material between the tubes 30 and 31, as indicated by the lines in Fig. 2.

In order to assist the material in its longitudinal travel through the drum from the inlet 27 to the outlet 28, the drum may be given a predetermined downward inclination from the inlet end to the outlet end. If desired, the drum may be inclined the other way in order to delay the travel of the material through the drum. In order to assist the travel of the material through the drum, it may be desirable to cause the gaseous medium to have a direction of flow corresponding to the travel of the material through the drum. A method for accomplishing this is illustrated in Fig. 4 wherein the inlet tube 30 is imperforate adjacent the outlet 28 for the material, and the outlet tube 31 for the gaseous medium does not extend the full length of the drum. Fig. 5 illustrates another method for accomplishing the change of direction of the air stream. In this embodiment, a plurality of blind-dampers 37 are arranged adjacent the outlet openings of the tube 30. The dampers change the direction of flow of the gaseous medium and may be regulated by means of a handle 38 extending through the end piece of the drum.

Preferably, the diameter of the drum is considerably greater than the axial length of the drum as is indicated in Fig. 3 of the drawings. In order to regulate the flow of the gaseous medium, the inlet and outlet tubes are adjustable axially in the end pieces. In the illustrated embodiments, the tubes are mounted in the end piece 29, but it is within the scope of the invention to mount one or both of the tubes in the opposite end piece 24.

The present apparatus permits the use of the highest possible temperature gradient between the gaseous medium and the treated material. Since the hot gases pass very rapidly through the curtain of the material in the present arrangement, the transverse flow of the gaseous medium in the drum reduces the possibility of adverse effect of heat on material which is unable to withstand high temperatures.

Having described our invention, what we claim as new and desire to secure by U. S. Letters Patent is:

1. Apparatus for treating pulverulent, granular, and like material by a gaseous medium comprising a cylindrical drum mounted for rotation about a substantially horizontal axis, inlet means for introducing the material into said drum at the rear end thereof, outlet means for withdrawing said material at the forward end of said drum, conveyor members disposed longitudinally of the drum and spaced circumferentially about the interior surface thereof operable upon rotation of said drum to carry the material from the bottom of said drum to the upper part thereof and to discharge the same in a substantially continuous longitudinal curtain, an inlet tube for gaseous medium disposed longitudinally of the drum at one side of said curtain and an outlet tube for the gaseous medium disposed longitudinally of the drum at the other side of said curtain, and means associated with said tubes to direct the gaseous medium in a predetermined narrow path transversely through said curtain.

2. Apparatus according to claim 1 wherein said inlet tube is spaced vertically below and horizontally from said outlet tube, and said outlet tube is perforated along its lower surface to cause the gaseous medium to flow in a predetermined narrow path upwardly through the curtain of material.

3. Apparatus for treating pulverulent, granular, and like material by a gaseous medium comprising a cylindrical drum mounted for rotation about a substantially horizontal axis, inlet means for introducing the material into said drum at the rear end thereof, outlet means for withdrawing said material at the forward end of said drum, conveyor members disposed longitudinally of the drum and spaced circumferentially about the interior surface thereof operable upon rotation of said drum to carry the material from the bottom of said drum to the upper part thereof and to discharge the same in a substantially continuous longitudinal curtain, an inlet tube for gaseous medium extending rearwardly in the drum a predetermined distance at one side of said curtain and an outlet tube for the gaseous medium extending rearwardly in the drum a shorter predetermined distance at the other side of said curtain, and means associated with said tubes to direct said gaseous medium in a predetermined narrow path transversely through said curtain in a direction having a forward component to assist the longitudinal travel of the material from said inlet means toward said outlet means.

4. Apparatus according to claim 3 including means for adjusting the predetermined rearward extensions of the tubes into said drum.

5. Apparatus for treating pulverulent, granular, and like material by a gaseous medium comprising a cylindrical drum mounted for rotation about a substantially horizontal axis, inlet means for introducing the material into said drum at the rear end thereof, outlet means for withdrawing said material at the forward end of said drum, conveyor members disposed longitudinally of the drum and spaced circumferentially about the interior surface thereof operable upon rotation of said drum to carry the material from the bottom of said drum to the upper part thereof and to discharge the same in a substantially continuous longitudinal curtain, an inlet tube for gaseous medium disposed longitudinally of the drum at one side of said curtain and an outlet tube for the gaseous medium disposed longitudinally of the drum at the other side of said curtain, and adjustable baffle means associated with said inlet tube to direct said gaseous medium in a predetermined narrow path transversely and forwardly through said curtain.

6. Apparatus according to claim 5 wherein said inlet tube extends rearwardly a predetermined distance, and said outlet tube extends rearwardly a shorter predetermined distance.

7. A method of treating pulverulent, granular and like material by means of a gaseous medium comprising the steps of introducing the material into one end of a chamber, causing the material to travel longitudinally through the chamber and out the other end, conveying the material from the bottom of the chamber to the top thereof during its longitudinal travel, allowing the material to fall freely back to the bottom of the chamber in a continuous longitudinal curtain of material dividing the chamber into two parts, and directing the gaseous medium in a narrow stream transversely through the curtain of material in a direction assisting the longitudinal travel of the material through the chamber to thereby effect treatment of the material.

8. A method of treating pulverulent, granular and like material by means of a gaseous medium comprising the steps of introducing the material into one end of a rotating drum, causing the material to travel longitudinally through the drum and out the other end, conveying the material from the bottom of the chamber to the top thereof during its longitudinal travel, allowing the material to fall freely back to the bottom of the chamber in a continuous longitudinal curtain of material dividing the chamber into two parts, and introducing the gaseous medium longitudinally into the drum on one side of the curtain and then directing the gaseous medium in a narrow stream transversely through a curtain of material to effect thereby treatment of the material and discharging the gaseous medium in the same manner on the other side of the curtain.

References Cited in the file of this patent

UNITED STATES PATENTS

| | | |
|---|---|---|
| 1,332,380 | Christie | Mar. 2, 1920 |
| 2,424,229 | Erisman | July 22, 1947 |
| 2,437,395 | Magnusson et al. | Mar. 9, 1948 |
| 2,504,378 | Bell | Apr. 18, 1950 |

FOREIGN PATENTS

| | | |
|---|---|---|
| 230,328 | Great Britain | Mar. 12, 1925 |